United States Patent [19]

Baist

[11] Patent Number: 5,549,782
[45] Date of Patent: Aug. 27, 1996

[54] LAMINATING APPARATUS

[75] Inventor: Bernhard Baist, Wuppertal, Germany

[73] Assignee: MELZER Maschinenbau GmbH, Germany

[21] Appl. No.: 261,888

[22] Filed: Jun. 17, 1994

Related U.S. Application Data

[63] Continuation of Ser. No. 7,654, Jan. 22, 1993, abandoned.

[30] Foreign Application Priority Data

Jan. 23, 1992 [DE] Germany ......................... 42 01 752.1

[51] Int. Cl.$^6$ .................................................. B44C 1/16
[52] U.S. Cl. .................. 156/540; 156/583.1; 156/583.8; 100/291; 100/292; 100/282; 74/53
[58] Field of Search ........................... 100/291, 292, 100/282; 156/583.1, 540, DIG. 45, 582, 583.8; 74/53, 567

[56] References Cited

U.S. PATENT DOCUMENTS

| | | | |
|---|---|---|---|
| 560,365 | 5/1896 | Parker et al. | 156/582 X |
| 1,902,012 | 3/1933 | Brown | 74/53 |
| 1,921,897 | 8/1933 | Topham | 74/53 |
| 2,988,834 | 6/1961 | Brownlee | 156/541 X |
| 3,492,182 | 1/1970 | Howard | |
| 3,585,837 | 6/1971 | Bihler | 74/53 X |
| 3,646,822 | 3/1972 | Pocaterra | 74/53 |
| 3,751,996 | 8/1973 | Beezer | 74/53 |
| 3,979,881 | 9/1976 | Seragnoli | 156/583.1 X |
| 4,044,619 | 8/1977 | Koch | 74/53 |
| 4,415,395 | 11/1983 | Paque | 100/293 X |
| 4,607,732 | 8/1986 | Ikeoka | 100/282 X |
| 5,080,747 | 1/1992 | Veix | 156/583.1 X |

FOREIGN PATENT DOCUMENTS

| | | | |
|---|---|---|---|
| 1578866 | 8/1969 | France. | |
| 2-308217 | 12/1990 | Japan | 156/580 |
| 2194754 | 3/1988 | United Kingdom | 156/443 |
| 8501913 | 5/1985 | WIPO. | |

*Primary Examiner*—David A. Simmons
*Assistant Examiner*—Steven J. Helmer
*Attorney, Agent, or Firm*—Thomas L. Bohan; Chris A. Caseiro

[57] ABSTRACT

A laminating apparatus is disclosed which is particularly suited to mount holograms on plastic cards. The apparatus comprises a planar support supporting the work pieces to be laminated. A press stamp has a shape of a sector of a circular cylinder wall and is driven by means of a special gear to perform a hobbing motion along the to-be-laminated area.

10 Claims, 7 Drawing Sheets

# LAMINATING APPARATUS

This is a continuation of application Ser. No. 007,654, filed Jan. 22, 1993, now abandoned.

FIELD OF THE INVENTION

The present invention relates to a laminating apparatus. It is well known in the art that lamination means to adhere a film or a film portion unto a substrate by means of heat bonding. The present invention is particularly suited to laminate so-called white light holograms unto plastic cards, e.g. credit cards.

DESCRIPTION OF THE PRIOR ART

A white light hologram comprises a piece of film having an embossed groove pattern representing a hologram so that it presents an apparent three-dimensional picture when viewed under certain angles even if illumination is with non-polarized light.

When laminating such a hologram unto a card both must be very accurately positioned and the embossed pattern must not be damaged. For this purpose two types of laminating apparatus are in use.

In the first type, the plastic cards are supported by a planar support, and the holograms are fed on a carrier tape. A heated stamp presses an individual hologram to be transferred unto a card, the stamp being moved orthogonally with respect to the support. There is a risk that air bubbles are trapped even if the working surface of the stamp is ground to assume a somewhat rounded shape; such rounded shape, in turn, results in a pressure which is higher in the central portion of the hologram than adjacent its edges. Consequently, there is a relatively high rejection rate.

The second known apparatus comprises a rotating heated stamp cooperating with a pressure roller which is also rotating. During lamination, the card and the hologram are transported through the gap between stamp and roller. It will be understood that the proper positioning causes difficulties, and in result the rejection rate is high again.

SUMMARY OF THE INVENTION

It is an object of the present invention to provide a laminating apparatus having a very low risk of entrapped air bubbles and, simultaneously, a very low risk of inadequate positioning.

The laminating apparatus of the present invention comprises a planar support which serves as an "anvil" during the lamination. Cards and holograms (or other work pieces to be laminated) are fed in superposed relation to the support whereby they may be accurately aligned. A stamp has a working surface shaped as a sector of a circular cylinder wall. A gear system is provided causing the stamp to advance relative to the support in a motion across the work pieces thereby following a partial cycloidal path. It is to be emphasized that the motion is not due to frictional engagement between the stamp and the work pieces but is uniquely caused by the particular design of the gear. Air between the hologram and the card may easily escape while proper relative positions of the laminated items is maintained because of the work pieces resting on the support during lamination.

A preferred embodiment of the invention is illustrated in the attached drawings and will be explained hereunder.

Figure 6:
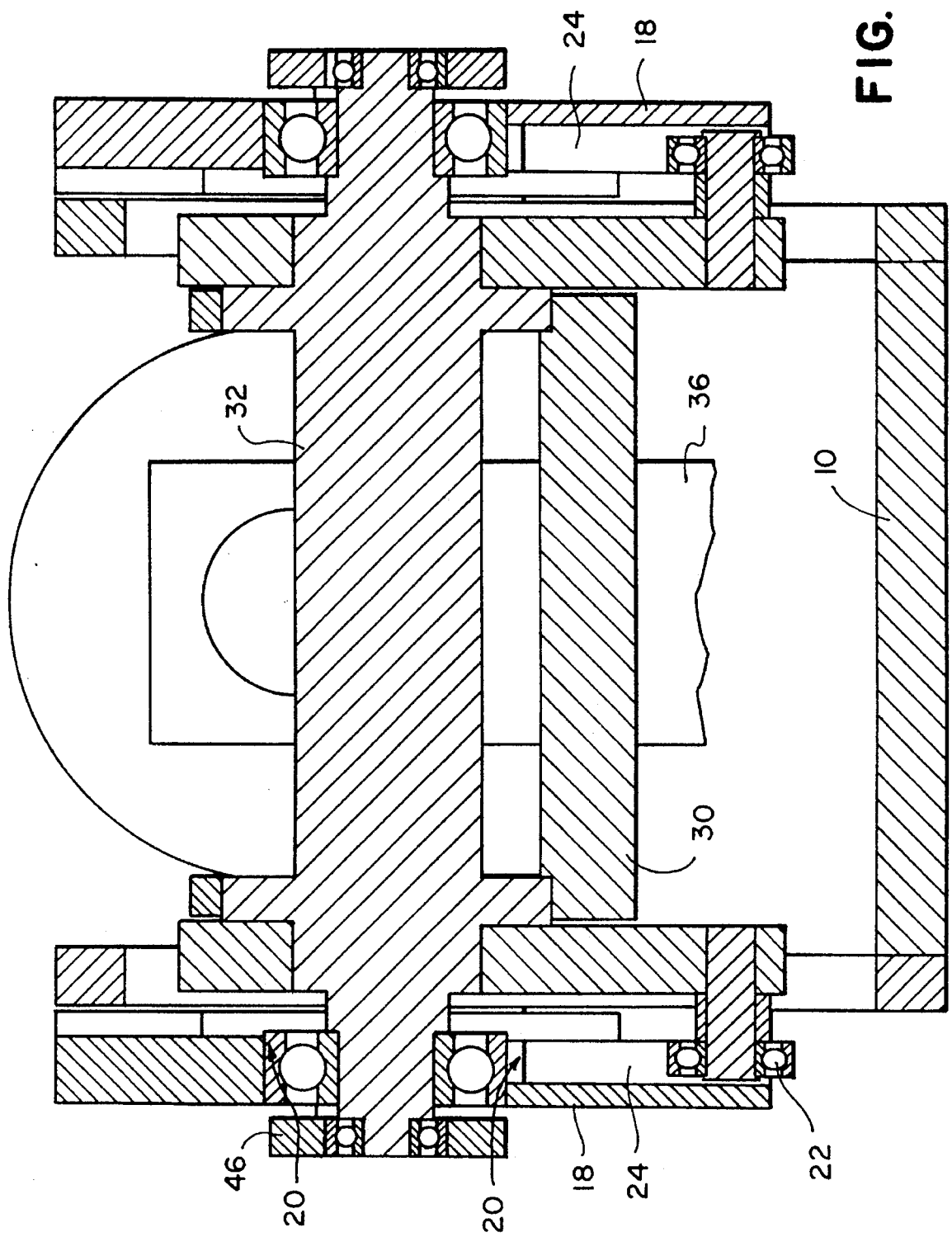
FIG. 6 and 7 are respectively section views in accordance with lines 6—6 and 7—7.
Figure 7:
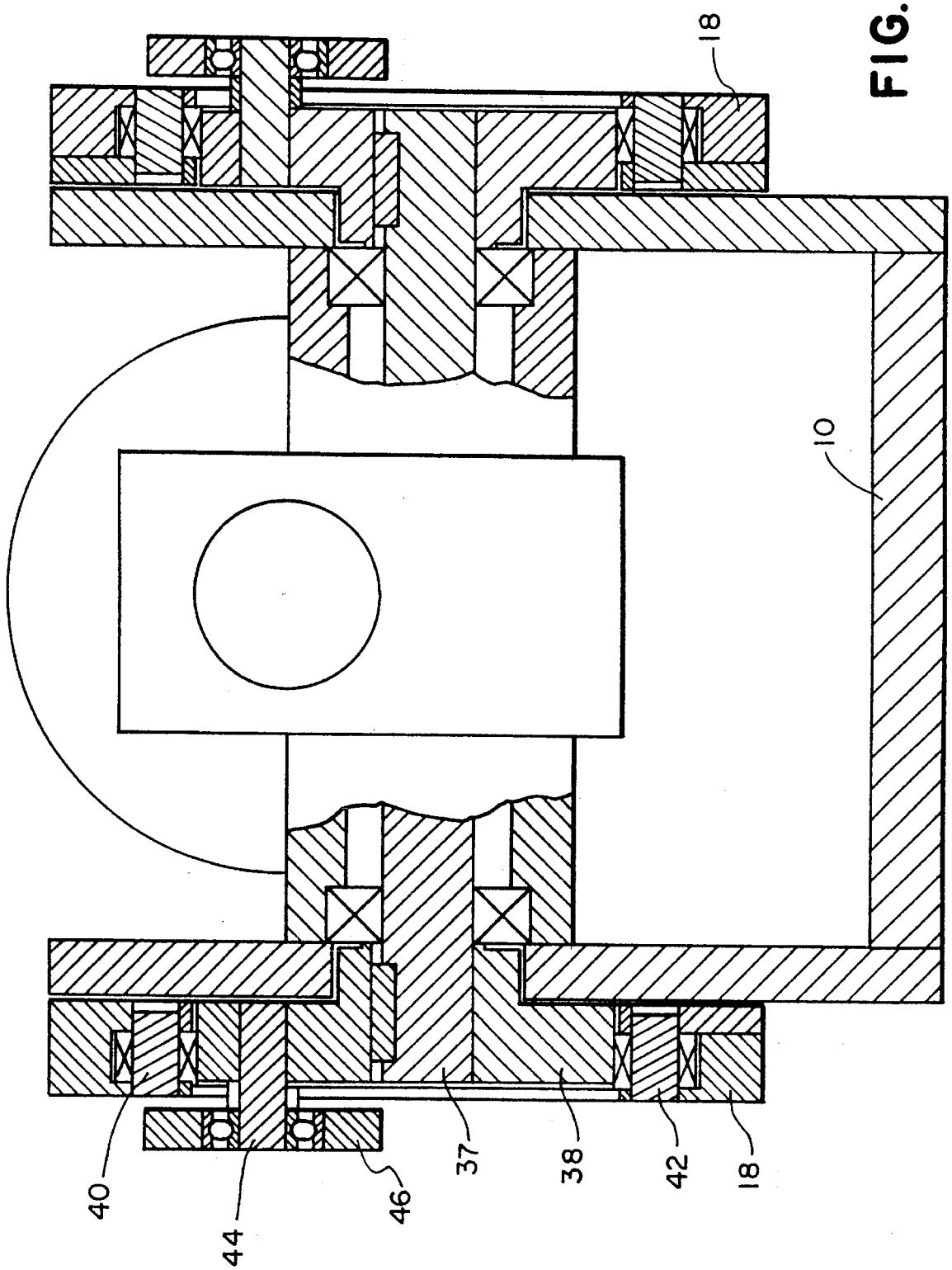

It is to be noted that FIG. 1 through 5 are substantially simplified and show only those elements which are important for the invention. At first the design will be explained with reference to FIG. 1, 6, and 7.

DETAILED DESCRIPTION OF THE PREFERRED EMBODIMENT

Figure 1:
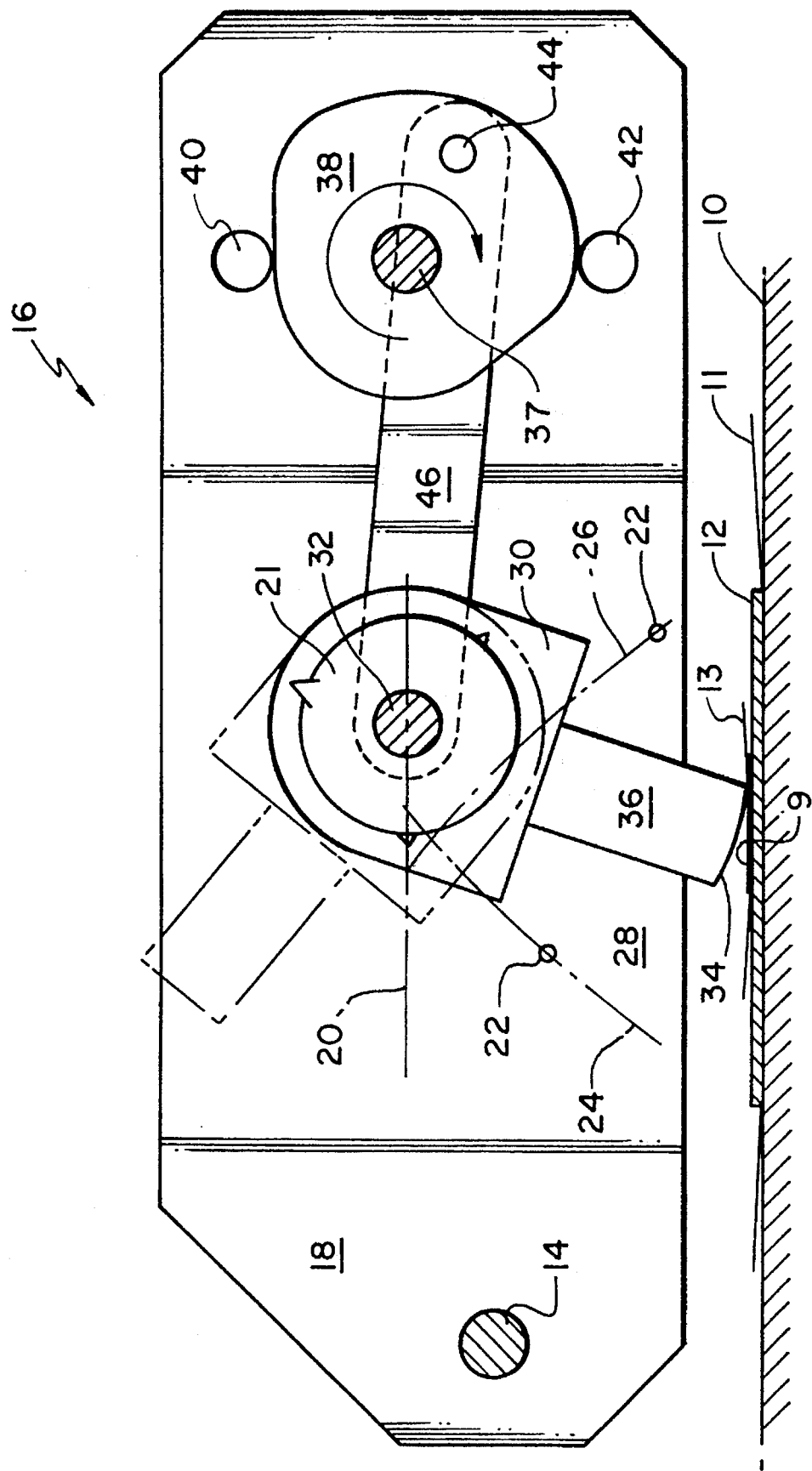
FIG. 1 through 5 show schematically and in side elevation five successive phases of the operation of an apparatus according to the invention.
Figure 2:
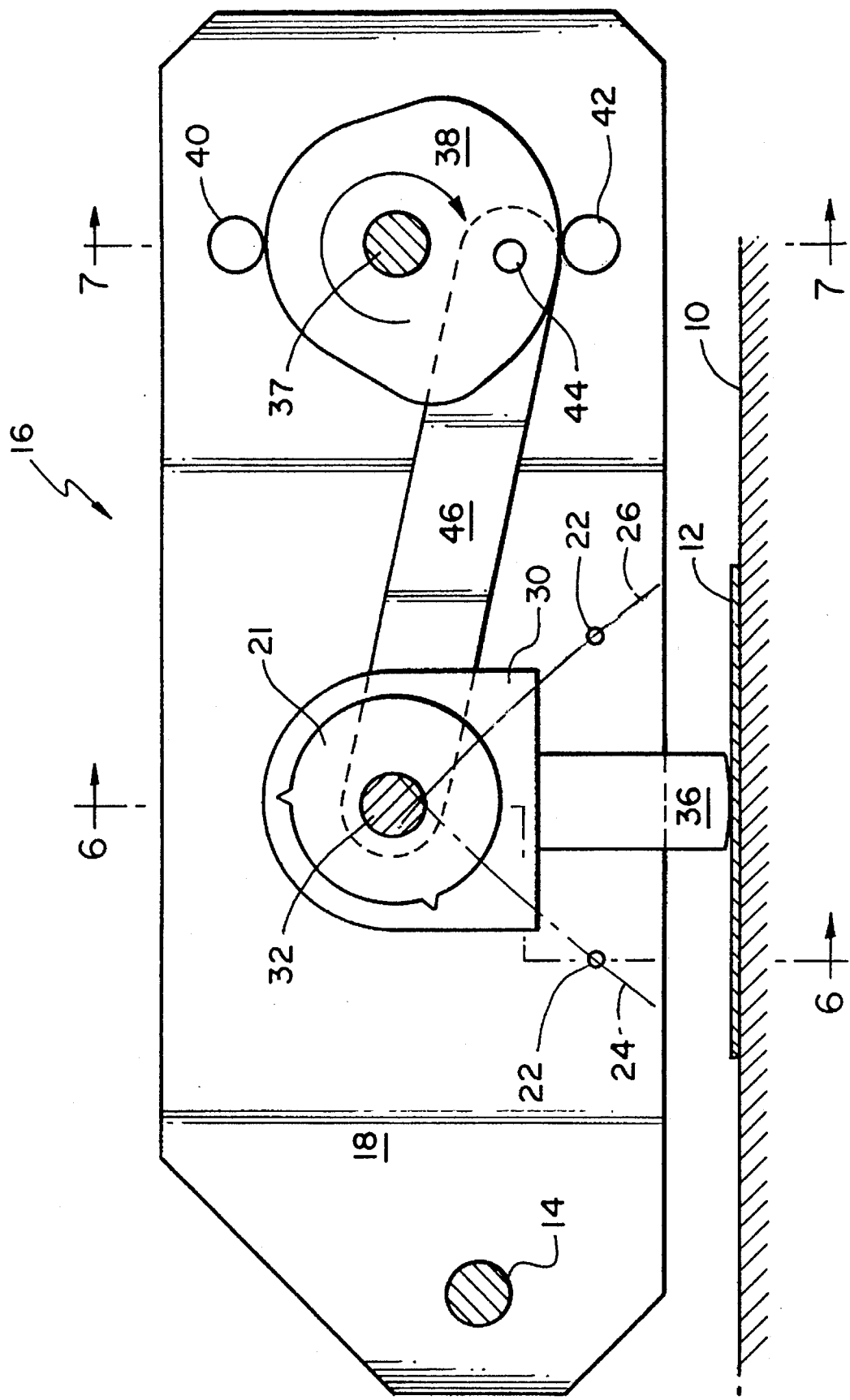
Figure 3:
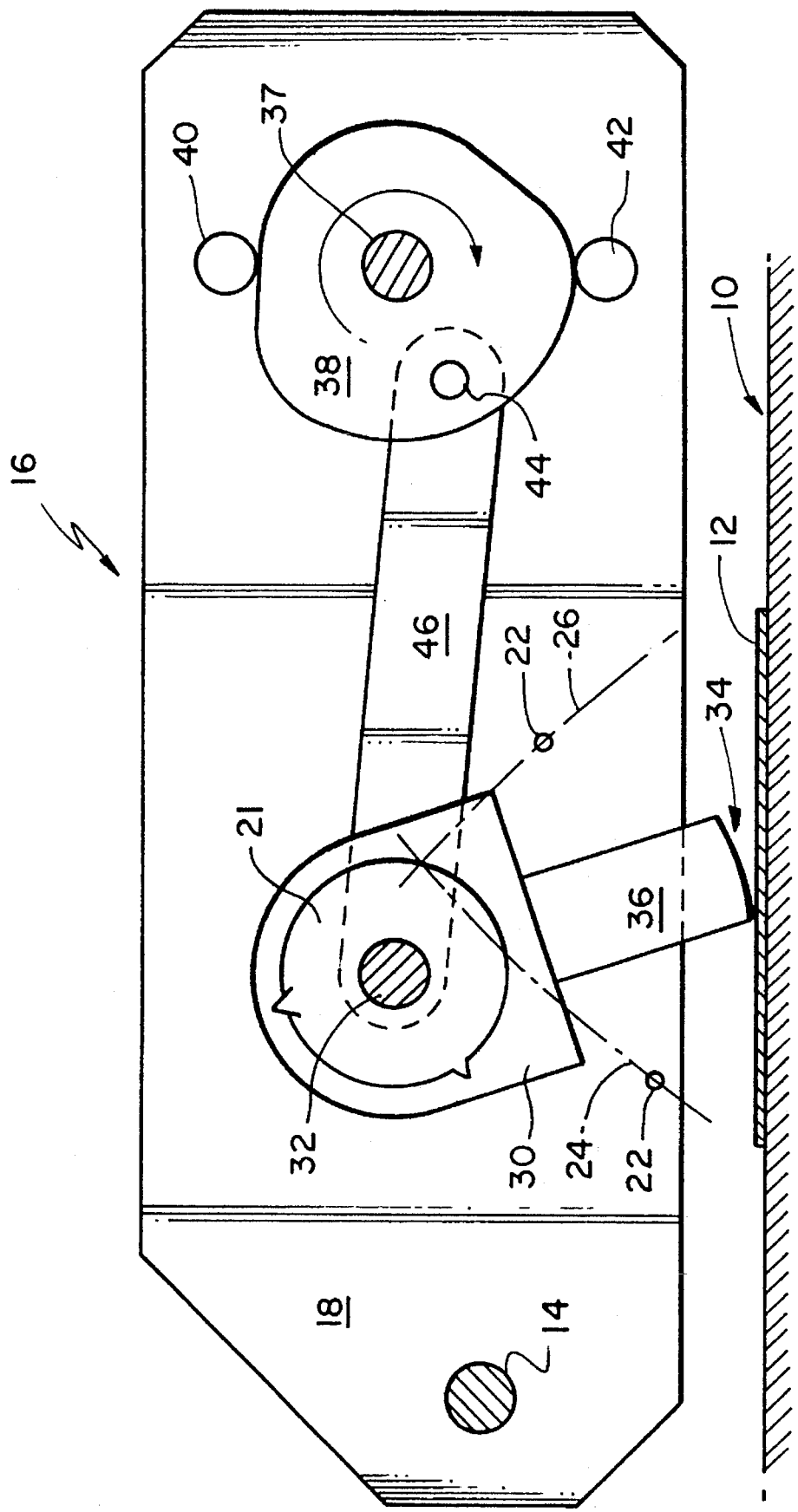

FIG. 1 illustrates the first instant of a laminating process. A base frame (not shown) supports a planar and horizontally arranged support 10 for plastic cards 12 fed from the right side by means of e.g. a carrier tape 11. Holograms 9 to be laminated unto the cards are supplied by means of a carrier tape 13. The holograms are optically aligned with the cards; these alignment means are not shown as they do not form a part of the present invention. Over support 10, a rocker member 16 is mounted pivotably about a shaft 14 carried by the base frame. Rocker member 16 comprises two congruent and parallel plates 18 each provided with guide tracks 20 (in FIG. 1 through 5 symbolized by a straight line), and these guide tracks 20 are congruent, too. A carriage 21 is guided by the guide tracks 20 so as to reciprocate relative thereto as illustrated in FIGS. 1 and 6. The carriage 21 has two roller bearings 22 (symbolized by small circles) which engage cam tracks 24, 26 on substantially triangular webs which are rigidly fastened on the inner faces of plates 18.

A stamp holder 30 is mounted on carriage 21. Holder 30 is pivotable about the axis of a shaft 32 between two end positions; a first end position is shown in solid lines and the second in phantom lines in FIG. 1. In operation, however, the stamp holder 30 is releasably connected to the carriage 21 in said first end position by means of e.g. a ball locking mechanism so that they move together. Mechanism 23 may be any type of well-known ball-locking means, such as a ball snapper commonly used in furniture. Only if maintenance of a stamp 36 is required the stamp holder 30 may be brought manually into the second end position, for example, when the working surface 34 of the stamp 36 is to be cleaned. Preferably, the stamp 36 is interchangeably mounted on the stamp holder 30. The working surface 34 has the shape of a sector of a circular cylinder wall and a size adapted to the size of a hologram to be sealed to a card. The center of curvature of the working surface 34 coincides with the axis of shaft 32.

A drive motor (not shown) is mounted on the base frame, and its output shaft 37 drives cam member 38 to rotate in a direction, such as indicated by the arrow illustrated. The outer circumference of cam member 38 is in engagement with cam followers 40, 42 mounted on plates 18. The cam followers 40, 42 may e.g. be the outer races of ball bearings. A crank 46 is pivotally connected to cam member 38 at 44 and its other end is pivotally connected to the carriage 21. Specifically, crank 46 is attached to carriage 21 by way of output shaft 37 and to cam 38 by way of crank pin 44, so that crank 46 rotates on both shaft 37 and on crank pin 44. Thus, upon each revolution of shaft 37 carriage 21 will perform one reciprocation.

Cam 38, rotating about a stationary axis, cooperates with cam followers 40, 42 which are rotatably mounted on plates 18, thereby causing a rocking motion of member 16. Driving shaft 37 has a stationary axis, while cam followers 40, 42 are mounted on plates 18 and can move so that they remain in engagement with the outer circumference of cam member 38, as illustrated in FIGS. 1–5 and FIG. 7. It is to be noted that rocker member 16 includes plates 18 and their components, as previously stated and as clearly illustrated in FIG. 7. Cam followers 40, 42 define the angular position of rocker member 16 when they are in engagement with the outer circumference of cam member 38, which rotates on stationary shaft 37. The shape of cam tracks 24, 26 is calculated or graphically designed such that the working surface 34 of the stamp 36 performs during the first half cycle (FIG. 1, 2, 3) a cycloidal motion along the hologram carrier tape 13. During this same half cycle, the working diameter of cam member 38 does not change so that rocking member 16 does not pivot either. In consequence, stamp 36 uniformly presses the hologram carrier tape 13 against the card 12.

Figure 4:
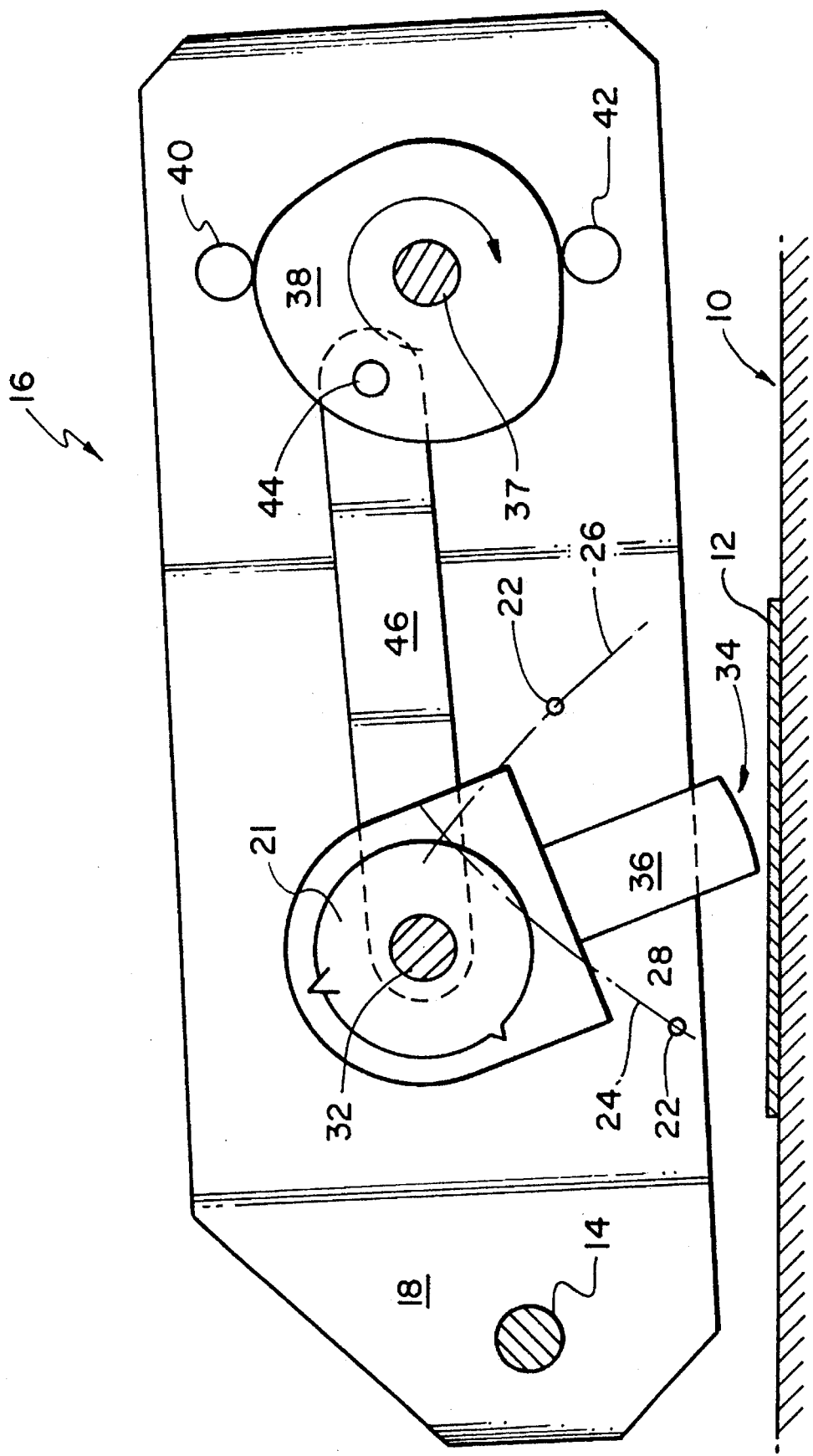
Figure 5:
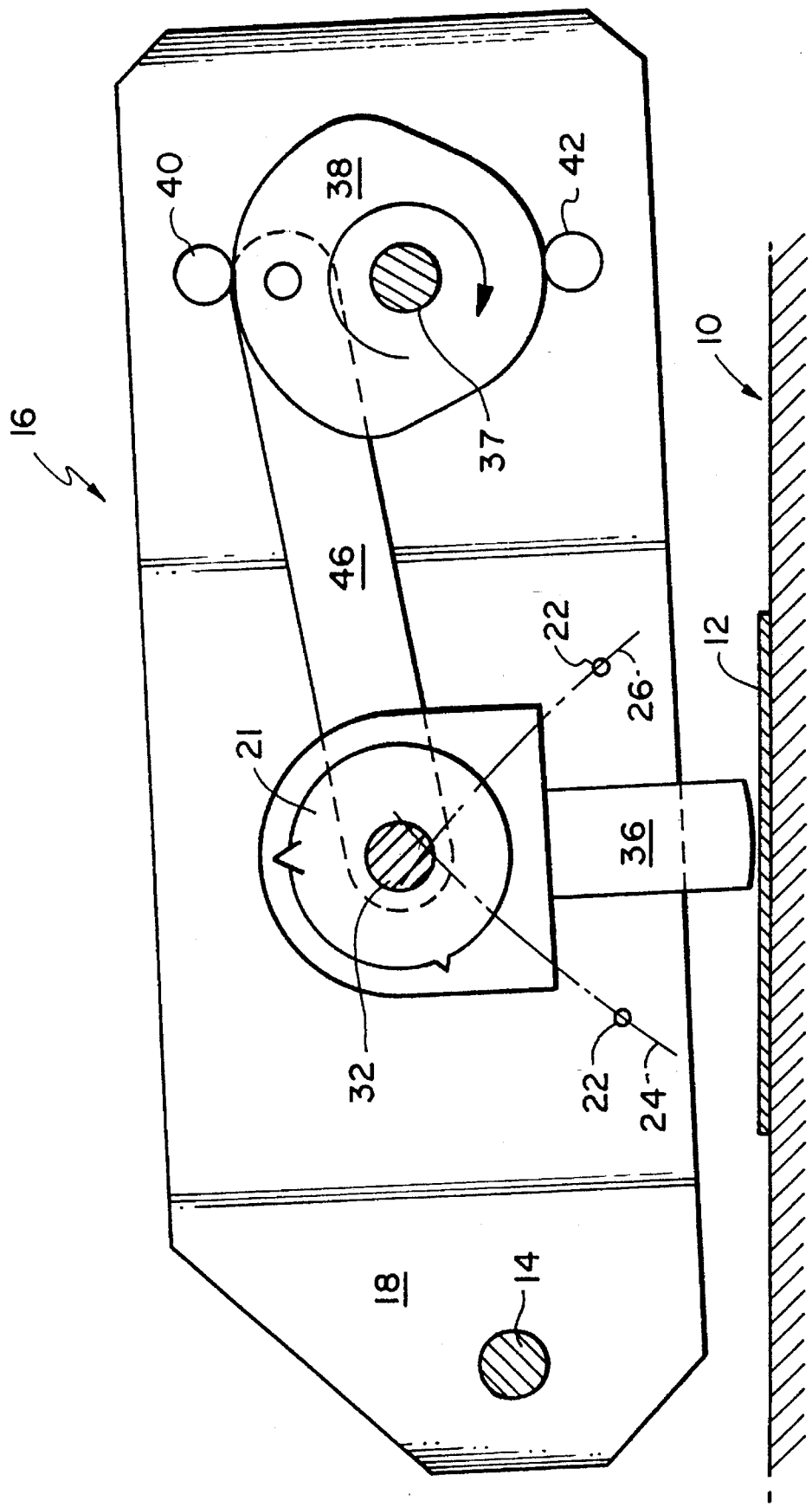

During the second half cycle, however, the operative diameter of cam member 38 changes so that the rocking member 16 is pivoted away from the support 10 by a predetermined angle, as seen in FIG. 4 and 5.

Stamp 36 is preferably heated by means of a temperature-controlled heating element housed in the stamp 36 and interchangeable together therewith.

I claim:

1. A laminating apparatus comprising:

a planar support, means for feeding work pieces to be laminated along said planar support towards a laminating position, a stamp having a working surface, said working surface having a shape of a sector of a circular cylinder wall, means for linearly guiding said stamp parallel to and across said support in a direction orthogonal to a cylinder axis of said cylinder wall, means for pivotably guiding said stamp so as to cause said stamp to rotate about said cylinder axis when said stamp is displaced along said linearly guiding means thereby causing said working surface to roll along said work pieces, said pivotal guiding means comprising a first cam follower set and a second cam follower set and allocated first and second cam track sets provided on said linear guiding means, said cam followers being held in engagement with said cam track sets by said linear guiding means.

2. The apparatus of claim 1 further comprising a stamp carrying and reciprocable carriage.

3. The apparatus of claim 2 further comprising crank drive means for reciprocating said carriage.

4. The apparatus of claim 1 further comprising means for displacing said working surface of said stamp away from said planar support after a lamination operation, and for returning said stamp to its initial position.

5. The apparatus of claim 2 further comprising a stamp holder for holding said stamp, said stamp holder being releasably coupled to said carriage.

6. The apparatus of claim 5 further comprising a ball locking mechanism coupling said stamp holder to said carriage.

7. A laminating apparatus, in particular for laminating white light holograms unto a plastic card, comprising:

a planar support, means for feeding work pieces to be laminated along said planar support towards a laminating position, a stamp having a working surface, said working surface having a shape of a sector of a circular cylinder wall, means for causing said stamp working surface to move along and in contact with said work pieces thereby following a partial cycloidal path, a stamp carrying and reciprocable carriage, means for guiding said carriage along a straight path substantially parallel to said planar support, and means for pivoting said carriage about an axis which is a center of curvature of said stamp working surface, a rocking member having said guiding means and supporting said carriage, said rocking member being pivotable towards and away from said planar support, and said rocking member being pivotable in response to positions assumed by said carriage relative to said guide means, and a power driven shaft and a crank coupling said shaft to said carriage, and including a cam mounted on said shaft and cooperating with cam followers mounted on said rocking member whereby rotation of said shaft causes a rocking motion of said rocking member.

8. A laminating apparatus, in particular for laminating white light holograms unto a plastic card, comprising:

a planar support, means for feeding work pieces to be laminated along said planar support towards a laminating position, a stamp having a working surface, said working surface having a shape of a sector of a circular cylinder wall, means for causing said stamp working surface to move along and in contact with said work pieces thereby following a partial cycloidal path, a stamp carrying and reciprocable carriage, means for guiding said carriage along a straight path substantially parallel to said planar support, and means for pivoting said carriage about an axis which is a center of curvature of said stamp working surface, and a stamp holder, said stamp being mounted on said stamp holder, and said stamp holder being releasably coupled to said carriage.

9. The apparatus of claim 8 wherein said stamp holder is pivotable about said axis through a predetermined angle relative to said carriage.

10. The apparatus of claim 9 further comprising a ball locking mechanism coupling said stamp holder to said carriage.

* * * * *